(12) United States Patent
Chao et al.

(10) Patent No.: US 12,103,072 B2
(45) Date of Patent: Oct. 1, 2024

(54) COMPOSITE PARTICLE MATERIAL FOR SELECTIVE LASER SINTERING, PREPARATION METHOD THEREOF, AND THREE-DIMENSIONAL PRINTING METHOD FOR HIGH-DENSITY GREEN BODY BY USING THE SAME

(71) Applicant: National Taiwan University of Science and Technology, Taipei (TW)

(72) Inventors: Yu-Deh Chao, Taipei (TW); Shu-Cheng Liu, Taipei (TW); Jeng-Ywan Jeng, Taipei (TW); Fu-Lin Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 151 days.

(21) Appl. No.: 18/155,060

(22) Filed: Jan. 16, 2023

(65) Prior Publication Data

US 2024/0207928 A1    Jun. 27, 2024

(30) Foreign Application Priority Data

Dec. 27, 2022  (TW) .................................. 111150104

(51) Int. Cl.
*B22F 1/103* (2022.01)
*B22F 1/05* (2022.01)
(Continued)

(52) U.S. Cl.
CPC ................ *B22F 1/103* (2022.01); *B22F 1/05* (2022.01); *B22F 3/1021* (2013.01); *B22F 10/16* (2021.01); *B22F 10/28* (2021.01); *B22F 10/64* (2021.01); *B33Y 10/00* (2014.12); *B33Y 40/10* (2020.01); *B33Y 40/20* (2020.01); *B33Y 70/00* (2014.12); *B22F 2301/35* (2013.01); *B22F 2304/10* (2013.01); *B22F 2998/10* (2013.01)

(58) Field of Classification Search
CPC .......... B22F 1/103; B22F 1/05; B22F 3/1021; B22F 10/16; B22F 10/28; B22F 10/64; B22F 2301/35; B22F 2304/10; B22F 2998/10; B22F 1/10; B33Y 10/00; B33Y 40/10; B33Y 40/20; B33Y 70/00; B33Y 70/10
See application file for complete search history.

(56) References Cited

U.S. PATENT DOCUMENTS

2021/0087372 A1* 3/2021 Bernardi ................ B33Y 70/00

* cited by examiner

*Primary Examiner* — Adil A. Siddiqui (57) ABSTRACT

The invention provides a composite particle material for selective laser sintering (SLS), which is composed of an inorganic powder coated with a binder. The composite particulate material is formed by mixing the inorganic powder and the binder to have the binder directly coated on the outer surface of the inorganic powder. In addition, the inorganic powder to be coated by the binder is preferably using a powder having a smaller particle size and a larger particle size distribution, and thereby the production cost can be greatly reduced. Further, since the outer surface of the inorganic powder is coated with the binder, there are no problems such as causing oxidation of the inorganic powder and so on. Furthermore, manufacturing the composite particle material can be easily carried out in a general ambient or an atmospheric environment, and the powder material after use is recyclable.

10 Claims, 4 Drawing Sheets

(51) Int. Cl.
  *B22F 3/10* (2006.01)
  *B22F 10/16* (2021.01)
  *B22F 10/28* (2021.01)
  *B22F 10/64* (2021.01)
  *B33Y 10/00* (2015.01)
  *B33Y 40/10* (2020.01)
  *B33Y 40/20* (2020.01)
  *B33Y 70/00* (2020.01)

COMPOSITE PARTICLE MATERIAL FOR SELECTIVE LASER SINTERING, PREPARATION METHOD THEREOF, AND THREE-DIMENSIONAL PRINTING METHOD FOR HIGH-DENSITY GREEN BODY BY USING THE SAME

CROSS-REFERENCE TO RELATED APPLICATION

The present application claims priority from Taiwanese Patent Application No. 111150104 filed on Dec. 27, 2022, the contents of which are incorporated herein by reference in their entirety.

FIELD OF TECHNOLOGY

The invention relates to the technical field of three-dimensional printing, particularly to a composite particle material for selective laser sintering, a preparation method thereof, and a three-dimensional printing method for a high-density green body by using the same.

BACKGROUND

A mainstream forming and manufacturing method for metal 3D printing is selective laser melting (SLM). SLM equipment has a laser power of 200 W-500 W. The method needs to directly melt a metal powder specially used for 3D printing for forming. A general sintering temperature of the metal powder (for example, metal powder with a hardness of 17-4PH) is 1,260° C. or more. The metal powder needs extremely high energy to melt and bind and printing time is quite long. Inert gas needs to be introduced during printing to ensure that the metal powder does not generate oxidation reaction during a high-temperature melting to affect the compactness of the metal powder.

Therefore, binder jetting is developed later to shorten processing time. The binder jetting is spraying a binder onto a thin layer of a powder material, the powder material may be an inorganic material such as a ceramic or a metal and the binder is generally a thermosetting plastic. During a printing process, a printing nozzle may move on a forming platform, such that the binder is sprayed onto the forming platform and curing forming is performed layer by layer. However, the technology has disadvantages of relatively long post-processing time and high consumable cost.

SUMMARY

In view of the above, the present inventors have made extensive studies and search for various possible solutions to solve the above problems in the prior art, and finally develop a composite particle material for selective laser sintering. During a manufacture process, a relatively low laser power (1 W-50 W) can be directly used to directly melt and form a binder in the composite particle material. Compared with a conventional method of binder jetting, manufacturing the composite particle material needs fewer mechanisms and is simpler. In addition, inorganic powder to be coated by the binder is preferably using a powder having a smaller particle size and a larger particle size distribution, and thereby the production cost can be greatly reduced. Further, since the outer surface of the inorganic powder is coated with the binder, there are no problems such as causing oxidation of the inorganic powder and so on. Furthermore, manufacturing the composite particle material can be easily carried out in a general ambient or an atmospheric environment, and the powder material after use is recyclable. Furthermore, the composite particle material for selective laser sintering of the invention can be easily controlled to have a particle size of 50 μm or less, a green body obtained by three-dimensional printing has a characteristic of high density, and a final product having a dense structure can be obtained.

Specifically, the invention provides a preparation method of a composite particle material for selective laser sintering. The preparation method comprises the following steps: (a) mixing an inorganic powder with a binder under a specific condition to form a dough-like object; and (b) grinding the dough-like object after the dough-like object is cooled, so as to obtain a particle material for three-dimensional printing, wherein a volume ratio of the inorganic powder to the binder is (43:57) to (72:28), a specific condition is a temperature of 25-410° C. and a rotation speed of 2-50 rpm, and the binder contains 70-90 vt % of a filler, 5-25 vt % of a backbone proppant, and 1-10 vt % of a surfactant.

According to one example of the invention, the filler is polyoxymethylene; the backbone proppant is at least one selected from high-density polyethylene (HDPE), polypropylene (PP), polyamide (PA), polycarbonate (PC), polymethyl methacrylate (PMMA) and ABS resin; and the surfactant is at least one selected from stearic acid (SA), carnauba wax, ethylene bis stearamide (EBS), paraffin, PE wax, antioxidant 1010 (CAS No. 6683-19-8), and microcrystalline wax.

According to one example of the invention, the inorganic powder has a D10 of 1-10 μm, a D50 of 3-25 μm, and a D90 of 20-100 μm.

According to one example of the invention, the inorganic powder is selected from any one of a metal, a ceramic, and a glass.

In addition, the invention may further provide a composite particle material for selective laser sintering, comprising an inorganic powder and a binder coated on an outer surface of the inorganic powder.

In addition, the invention may further provide a three-dimensional printing method for a high-density green body, comprising the following steps: (a) obtaining a composite particle material for selective laser sintering using the preparation method; (b) laying the composite particle material for selective laser sintering into a powder layer, preheating the powder layer, and selectively irradiating the powder layer by laser beam scanning to melt and coalesce the irradiated region; (c) cooling and solidifying the region to form a thin layer which is a part of the high-density green body; and (d) repeating step b and step c to stack layer by layer until the high-density green body is obtained, wherein the high-density green body has a density equal to or greater than 2.325 g/cm$^3$.

According to one example of the invention, in step (a), a particle size of the composite particle material for selective laser sintering is smaller than a thickness of the powder layer, and when a powder-spreading thickness of the powder layer is 100 μm, the particle size of the composite particle material for selective laser sintering is 44-75 μm; and a laser beam has an energy density of 0.0281-0.049 J/mm$^2$ and a preheating temperature is 120-140° C.

According to one example of the invention, after step d, the high-density green body is processed by a degreasing process and a sintering process in sequence to obtain a final product composed of the inorganic powder.

According to one example of the invention, the degreasing process is any one of catalytic degreasing, solvent degreasing, and thermal degreasing, and the sintering process is performed at a temperature of 1,200-1,450° C. for a total time of 11-40 hours.

DESCRIPTION OF THE EMBODIMENTS

In order to enable the objective, technical features and advantages of the invention to be more understood by a person skilled in the art to implement the invention, the invention is further illustrated by accompanying the appended drawings, specifically clarifying technical features and embodiments of the invention, and enumerating better examples. In order to express the meaning related to the features of the invention, the corresponding drawings herein below are not and do not need to be completely drawn according to the actual situation.

Herein, the singular forms "a", "an", and "the" are intended to include plural forms, unless the context clearly indicates other situations. It will be further understood that the terms "comprises" and/or "includes" when used in this description, specify the presence of stated features, components, and/or elements, but do not preclude the presence or addition of one or more other features, components, and/or elements, which should be explained clearly in advance. In addition, in the following detailed description of the various examples in conjunction with the drawings, the directional terms used in the following examples, such as "up", "down", "left", "right", "front", "back", etc. can be clearly presented, which are merely used with reference to directions shown in the attached drawings. Accordingly, the used directional terms are used to illustrate, but not to limit the invention.

Furthermore, it is also clear to those skilled in the art that: the illustrated examples and attached drawings are only provided for reference and illustration, but are not intended to limit the invention; and modifications or variations which can be easily made based on the above description to complete an invention, are considered to be not departing from the spirit and scope of the invention. Of course, the invention is also included in the claims of the present invention.

Firstly, a preparation method of a composite particle material for selective laser sintering according to the invention is described, comprising the following steps:
step S1: mixing an inorganic powder with a binder under a specific condition to form a dough-like object; and
step S2: grinding the dough-like object after the dough-like object is cooled, so as to obtain a particle material for three-dimensional printing.

According to the technical idea of the invention, the inorganic powder may be selected from any one of a metal, a ceramic, and a glass, preferably a stainless steel; and the inorganic powder has a D10 of 1-10 µm, a D50 of 3-25 µm, and a D90 of 20-100 µm.

In addition, the binder contains a filler, a backbone proppant, and a surfactant; the filler serves as a solvent in a solution to provide a sufficient volume for solute dispersion, most of which needs to be removed during a degreasing phase; the backbone proppant is equivalent to a solute and is a supporting component required to be reserved in a green body to a metallization sintering stage; and the surfactant is used for promoting the solution to be fused with the solute and playing a role in lubricating and dispersing.

Particularly, the filler is polyoxymethylene.

The backbone proppant may be at least one selected from high-density polyethylene (HDPE), polypropylene (PP), polyamide (PA), polycarbonate (PC), polymethyl methacrylate (PMMA) and ABS resin; preferably, at least one selected from high-density polyethylene (HDPE), polycarbonate (PC), polymethyl methacrylate (PMMA) and ABS resin; and more preferably, at least one selected from high-density polyethylene (HDPE), polymethyl methacrylate (PMMA) and ABS resin.

The surfactant may be at least one selected from stearic acid (SA), ethylene bis stearamide (EBS), carnauba wax, paraffin, PE wax, antioxidant 1010 (CAS No. 6683-19-8), and microcrystalline wax; preferably, at least one selected from stearic acid (SA), ethylene bis stearamide (EBS), carnauba wax, paraffin, and PE wax; and more preferably, at least one selected from stearic acid (SA), ethylene bis stearamide (EBS), and carnauba wax.

In step S1, the inorganic powder and the binder are put into an open-close type mixer to be mixed, wherein a volume ratio of the inorganic powder to the binder is generally (43:57) to (72:28); preferably (45:55) to (67:33).

An interior of a cavity of the open-close type mixer an "o" shape and a pair of rotors arranged left and right rotate relatively clockwise and counterclockwise respectively. When a material is added into the mixing cavity, the rotors inside the mixing cavity rotate to drive the material to extrude and knead towards a central cuspidal edge of the cavity and then the material is divided and flows towards two sides. The binder between the inorganic powders gradually melts along with an arrival of a melting point by heating via a heating device under the cavity. A cutting and friction effect of a mechanical force caused by rotation of the rotors in a process can produce high heat and high pressure to promote transfer between materials, such that the binder is fully dispersed among the inorganic powders and uniformly mixed to coat the inorganic powder, such that the raw materials are strongly cut and mixed in the closed cavity and then fully dispersed and plasticized to form a dough-like object.

A specific operation method is that after the inorganic powder and the binder are weighed according to a proportion, the inorganic powder is placed into the mixing cavity of the mixer to be preheated to 100° C. and stirred for about 15 min to remove residual moisture in the powder. Then the binder is added. According to different melting temperatures of components in the binder, temperature is adjusted and controlled to ensure that the binder can be fully dispersed among the inorganic powders. The mixing is continued until the binder melts and the composite material presents a dough-like sticky state with uniform color and luster and without obvious chromatic aberration.

Generally, the mixing is performed at a temperature of 25-410° C. and at a rotation speed of 2-50 rpm.

Next, in step S2, after the flexural dough-like object is cooled and solidified, the dough-like object is ground by a grinder. After the grinding is completed, the powder body having a desired particle size range is screened by a screening machine, i.e., the composite particle material for selective laser sintering of the invention.

The composite particle material for selective laser sintering may obtain a high-density green body through a three-dimensional printing. A specific method comprises the following steps:

step T1: obtaining a composite particle material for selective laser sintering using the preparation method;

step T2: laying the composite particle material for selective laser sintering into a powder layer, preheating the powder layer, and selectively irradiating the powder layer by laser beam scanning to melt and coalesce the irradiated region;

step T3: cooling and solidifying the region to form a thin layer which is a part of the high-density green body; and step T4: repeating step T2 and step T3 to stack layer by layer until the high-density green body is obtained.

A particle size range of the composite particle material for selective laser sintering depends on a thickness of a single-layer powder layer during selective laser sintering. Generally, the particle size of the composite particle material for selective laser sintering is smaller than the thickness of the single-layer powder layer. However, if the particle size of the composite particle material for selective laser sintering is too small, it will lead to dense stacking of the powder and thus the powder cannot be spread smoothly. For example, when a powder-spreading thickness of the powder layer is 100 μm, the particle size of the composite particle material for selective laser sintering is preferably 44-75 μm, more preferably 63-75 μm.

In addition, a laser energy density and a preheating temperature of a laser beam also affect physical properties of the green body, such that the laser energy density is preferably 0.0281-0.049 J/mm$^2$ and the preheating is preferably performed at a temperature of 120-140° C.

The high-density green body obtained by the above steps can be subjected to a degreasing process and a sintering process to obtain a final product composed of the inorganic powder. The degreasing process is any one of catalytic degreasing, solvent degreasing, and thermal degreasing. 30-90 wt % of the binder can be removed to obtain a degreased green body and the remaining binder left after the degreasing will be used as a support for a subsequent degreased green body in a sintering process. In addition, the sintering process is performed at a temperature of 1,200-1,450° C. for a total time of 11-40 hours. During the sintering process, the remaining binder in the degreased green body will be gradually removed. Besides, after particles contact each other, the inorganic powder will produce mass transfer to form a sintering neck, the neck grows and thickens, pores between the inorganic powders shrink, and the inorganic powder is finally densified. A volume of the green body is shrunk and converted into an inorganic sintering body after the sintering process is completed to obtain a final product. The invention is explained in detail through the following specific examples.

Example 1

The inorganic powder used in the example is a stainless steel 316L powder. The stainless steel powder is Hengji aerosolized 316L powder represented by Jiahui Optoelectronics and has a D10 of 4.20 μm, a D50 of 12.11 μm, a D90 of 26.34 μm, a tap density of 5.00 g/cm$^3$, and an apparent density of 3.56 g/cm$^3$.

In addition, the binder used in this example is composed of high-density polyethylene (HDPE), polyoxymethylene (POM), stearic acid (SA), carnauba wax, and ethylene bis stearamide (EBS), and the high-density polyethylene has a density of 0.95 g/cm$^3$, the polyoxymethylene has a density of 1.4 g/cm$^3$, the stearic acid has a density of 0.84 g/cm$^3$, the carnauba wax has a density of 0.9950.84 g/cm$^3$, and the ethylene bis stearamide has a density of 0.901 g/cm$^3$.

In this example, a volume ratio of the inorganic powder to the binder is 65:35 (weight ratio: 92:8). The binder contains 12.9 vt % of high-density polyethylene (HDPE), 82.1 vt % of polyoxymethylene (POM), 1.3 vt % of stearic acid (SA), 1.6 vt % of carnauba wax, and 2.1 vt % of ethylene bis stearamide (EBS).

Firstly, the materials are weighed according to an experimental proportion, then the inorganic powder is placed into a mixing cavity of an open-close type mixer to be preheated to 100° C., the inorganic powder is stirred for about 15 min to remove residual moisture in the powder, then the high-density polyethylene (HDPE), polyoxymethylene (POM), stearic acid (SA), carnauba wax, and ethylene bis stearamide (EBS) are added and mixed at a temperature of 185° C. and a rotation speed of 35 rpm for 1.5 hours to be shaped into a dough-like object.

A small block of the dough-like object is cut for testing a density of an uncrushed state, the test piece is placed on an empty weight platform to measure the weight of an object in the air, then the test piece is put into a basket in water to remove air bubbles on a surface of the test piece using ultrasonic oscillation, the weight of the object in water is weighed, the volume $V_{in\ liquid}$ of the test piece in liquid is obtained by subtracting the weight $W_{in\ liquid}$ of the test piece in water from the weight $W_{in\ air}$ of the test piece in the air, and dividing a density $\rho_{liquid}$ of water. The volume $V_{in\ liquid}$ of the test piece in liquid is converted into a density D of the test piece of about 5.02 g/cm$^3$ by a weight-volume formula.

After the dough-like object is cooled, the dough-like object is ground using a grinder and screen with a screen mesh, so as to obtain a particle material for three-dimensional printing.

Then after microscopic stereo characteristics of the particle material for three-dimensional printing are observed by using a hot lamp filament scanning electron microscope JEOL JSM-6390LV microscope from National Taiwan University of Science and Technology, it can be known that when a high polymer material with a low melting point is melted between metal powders and the high polymer is coated between the powder particles by mechanical stirring friction along with the capillarity of the material. Most of original 316 stainless steel powders are dispersed spherical powders observed by an SEM electron microscope. A large amount of stainless steel powders are coated and bound into a large-scale core-shell powder by the high polymer after being mixed by the mixer. A composite material at a periphery is taken for observation, and stainless steel as a core and core-shell powder coated with a polymer thin layer are found.

Subsequently, a sample is taken from the particle material for three-dimensional printing and a DSC thermal analysis is performed using Perkin Ekmer DSC 8000. The principle is that a few milligrams of the sample and a reference product (usually an empty ingot) are respectively placed into an instrument and heated simultaneously, through sensing differences between an absorbed or released energy when a material has a phase change in a heating process, a compensator adds or extracts heat for keeping a temperature between the sample and the reference product consistent, a performance of heat absorption and release of the material under the temperature is measured, and a curve is drawn so as to analyze characteristic temperatures of the material, such as a melting point, a crystallization point and the like.

Figure 1:
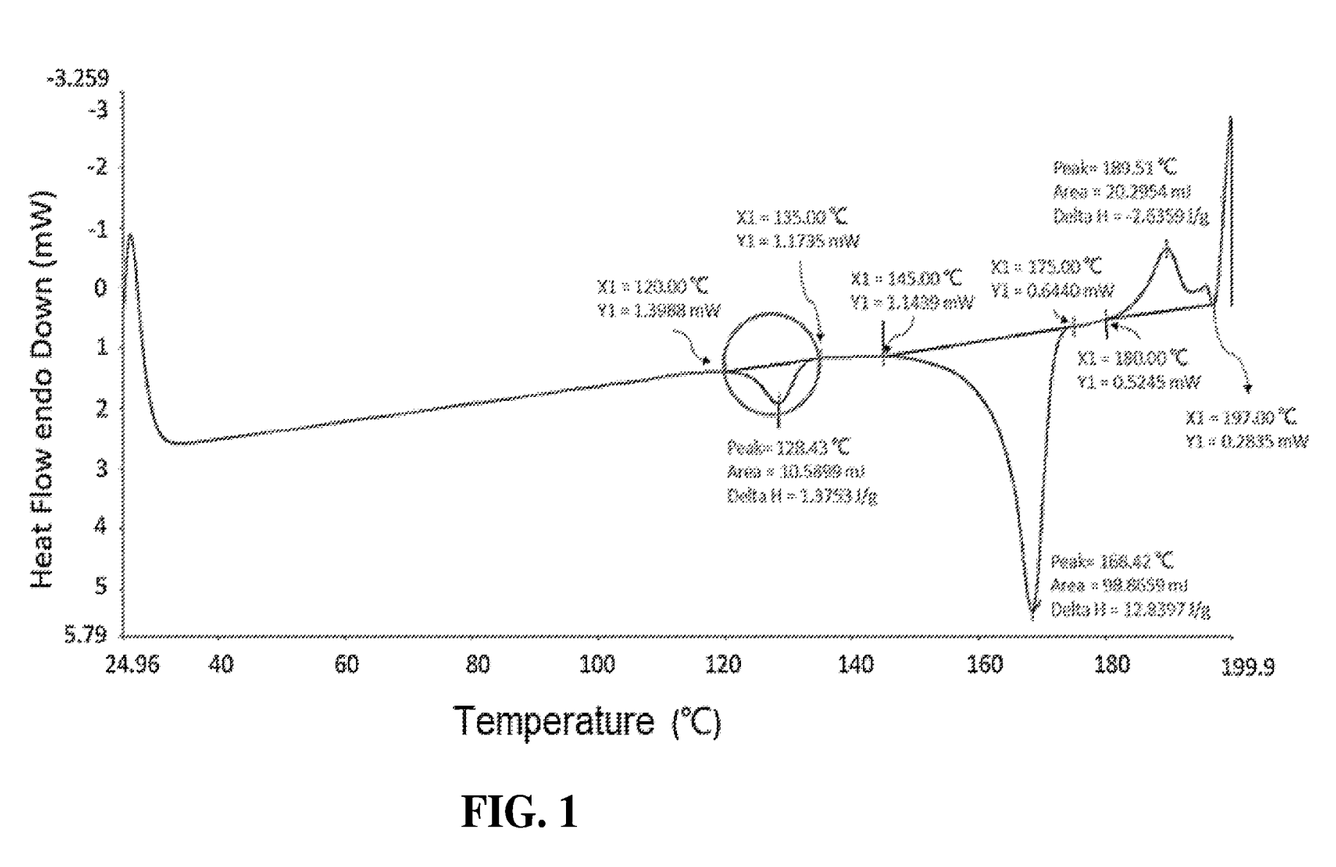
FIG. 1 is a DSC thermal analysis diagram of a particle material for three-dimensional printing in example 1.

When the material is heated to 200° C. at a rate of 10° C. per minute, the material is analyzed and the result is shown in FIG. 1. The material absorbs heat at temperatures around 128° C. and 168° C. to generate positive melting peaks corresponding to the high-density polyethylene and polyoxymethylene added in the material respectively. An exothermic peak at 189° C. represents that a part of the high polymer is subjected to a crosslinking reaction. A first section of a melting curve is 120-135° C. The initial 120° C. of a curve change is used as a main preheating temperature in a powder printing experiment by matching with a sign of a middle change in the mixing process.

Example 2

In this example, three-dimensional printing is performed using the particle material for three-dimensional printing obtained in example 1 and a Sinterit Lisa SLS 3D printer. A particle size distribution and printing operation parameters of the particle material for three-dimensional printing used in each group are shown in Table 1 below (a preheating temperature of a powder supply tank is fixed at 90° C.).

TABLE 1

| Groups | Particle size of particle material for three-dimensional printing (μm) | Preheating temperature of printing tank (° C.) | Energy density (J/mm$^2$) | Thickness of spreading layer (μm) |
|---|---|---|---|---|
| A | 75~125 | 120 | 0.049 | 100 |
| B | 44~75 | 120 | 0.049 | 100 |
| C | Less than 44 | 120 | 0.049 | 100 |

The powders with the particle size larger than 125 μm, 75-125 μm, 44-75 μm, and less than 44 μm are screened by using No. 120, No. 200, and No. 325 three layers of screen meshes, the obtained amount is recorded in Table 2. Pouring states of the powders in the last three powder sieving intervals in a 20-ml glass sample bottle after comparison are observed visually. It is found that a pouring inclined plane of the powder in a particle size interval of 75-125 μm is smooth and free of obvious agglomeration, a pouring inclined plane of the powder in a particle size interval of 44-75 μm is rough and slightly agglomerated, and when the powder in a particle size interval of less than 44 μm is poured, a detritus-shaped agglomerated powder occurs. Therefore, powder spreading and printing parameters of groups A, B and C are arranged. The particle size intervals suitable for powder spreading and printing are tested.

TABLE 2

| Screening sequence | No. of screen mesh | Aperture of screen mesh (μm) | Classification interval (μm) | Obtained weight (g) | Yield (%) |
|---|---|---|---|---|---|
| — | — | Larger than 125 | Larger than 125 | 80 | 2.11 |
| 1 | 120 | 125 | 75-125 | 1207 | 31.78 |
| 2 | 200 | 75 | 44-75 | 2025 | 53.32 |
| 3 | 325 | 44 | Less than 44 | 486 | 12.80 |

Note: screening time is 10 min each time and an operating weight is 200 g.

Then three-dimensional printing results of each group are explained below.

1. Group A

When results of powder spreading and printing in group A are observed, a powder surface is visually observed to be smooth. No powder stacking and rising occurs on the surface of the powder in the powder supply tank. The surface of the powder in the printing tank is asymmetric due to insufficient powder conveying, but a block-shaped protrusion is found in the printing tank. A test piece covered in the powder is taken out. It is found that the test piece is dragged and lengthened layer by layer, indicating that a powder spreading surface appears smooth in the particle size interval. However, actually, an interaction of an upper layer powder and a lower layer powder is caused during powder spreading due to overlarge powder particles, such that the green body is seriously layered and deformed. The dragged rectangular test piece is taken and subjected to density determination to obtain a density of 2.325 g/cm$^3$.

2. Group B

Figure 2:
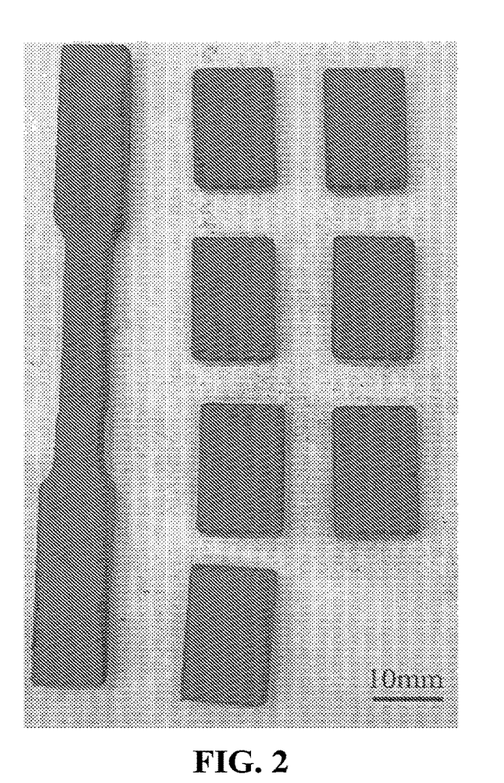
FIG. 2 shows a green body of group B in example 2.

The powder spreading and printing results of group B show that a side surface of the powder supply tank has powder spreading residual powder traces, but no powder stacking and rising is caused. A powder spreading state of a printing tank side is coarser in surface than that of group A. An actually printed internal test piece is shown in FIG. 2, has a complete appearance and is not seriously deformed by dragging. Length, width, middle-section end thickness of a long side, weight, and density of the green body printed by a rectangular test piece picture file with a length, a width, and a height of 20 mm, 12 mm, and 4 mm respectively are measured. An average density is calculated to be 3.012 g/cm$^3$.

3. Group C

The powder rises on a side surface of the powder supply tank of group C. The powder is unevenly spread on a printing tank side and a test piece inside is broken. Therefore, the test piece is not further measured and the powder is not suitable for printing when the screening particle size is smaller than 44 μm.

Example 3

Based on the results of example 2, it is found that when a printing layer thickness is 100 μm, an object dragging phenomenon occurs in the powder in a particle size interval of 75-125 μm, the powder in a particle size interval of 44-75 μm can be successfully printed and formed, and has a density reaching about 3.012 g/cm$^3$, and the powder in a particle size smaller than 44 μm has a powder-spreading defect in a powder supply position and thus results in printing failure. In order to find out a more suitable particle size interval for powder printing, an experimental screen aperture is adjusted to be subdivided into six layers of screens from No. 140 to No. 325, and the obtained results are shown in Table 4.

TABLE 4

| Screening sequence | No. of screen mesh | Aperture of screen mesh (μm) | Classification interval (μm) | Obtained weight (g) | Yield (%) |
|---|---|---|---|---|---|
| — | — | Larger than 105 | Larger than 105 | 209 | 2.48 |
| 1 | 140 | 105 | 105~88 | 2293 | 27.20 |
| 2 | 170 | 88 | 88~75 | 2758 | 32.72 |
| 3 | 200 | 75 | 75~63 | 1860 | 22.06 |
| 4 | 230 | 63 | 63~53 | 446 | 5.29 |
| 5 | 270 | 53 | 53~44 | 329 | 3.90 |
| 6 | 325 | 44 | Less than 44 | 535 | 6.35 |

Note: screening time is 10 min each time and an operating weight is 200 g.

Based on the results of Table 4, the powders of three intervals of 105 μm, 88 μm, and 75 μm with the yield of more than 20 wt % are tested in consideration of powder usability.

In this example, three-dimensional printing is performed using the particle material for three-dimensional printing obtained in example 1 and an Sinterit Lisa SLS 3D printer. A particle size distribution and printing operation parameters of the particle material for three-dimensional printing used in each group are shown in Table 5 below (a preheating temperature of a powder supply tank is fixed at 90° C.). A printed pattern is a long test piece having a length (L), a width (W) and a thickness (t) of 15 mm, 10 mm and 4 mm respectively, a size, a weight and a density of the green body are recorded, and thicknesses $t_1$ and $t_2$ at both ends of a long side are used to indicate a degree of warp deformation of the test piece.

TABLE 5

| Groups | Particle size of particle material for three-dimensional printing (μm) | Preheating temperature of printing tank (° C.) | Energy density (J/mm²) | Thickness of spreading layer (μm) |
|---|---|---|---|---|
| D | 88~105 | 120 | 0.049 | 100 |
| E | 75~88 | 120 | 0.049 | 100 |
| F | 63~75 | 120 | 0.049 | 100 |

Three-dimensional printing results of each group are explained below.

4. Group D

In the case of powder spreading and printing in group D, the powder partially rises on the powder supply tank side and is not evenly spread in the printing tank. The printed test piece is distorted since a printing layer is dragged. Measurement data of the test piece shows that the test piece deforms seriously at W and tm, such that the thickness at two ends is not further measured. An average density is about 2.491 g/cm³.

5. Group E

In group E, there is no obvious defect on the powder surface of the powder supply tank and the printing tank. A relatively obvious streak appears in the printed test piece. Measurement data of the test piece shows an average density is about 2.990 g/cm³.

6. Group F

Figure 3:
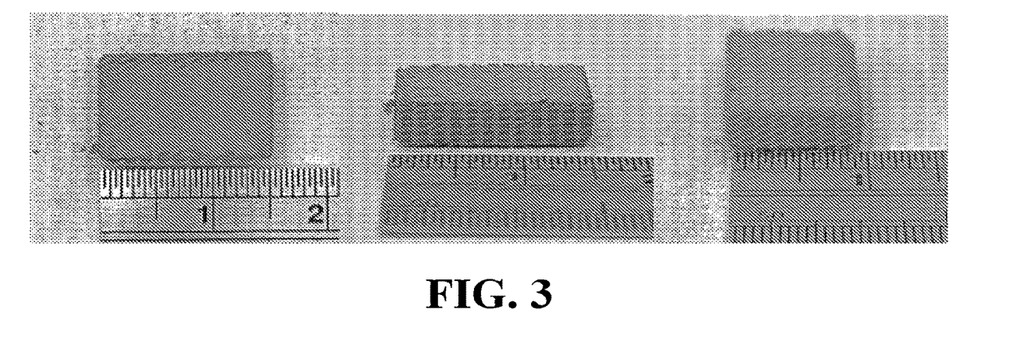
FIG. 3 shows a green body of group F in example 3.

Surfaces of the powders in the powder supply tank and the powder printing tank in group F are slightly coarser than those in group E. An appearance of the test piece is shown in FIG. 3. Except for partial burrs, no obvious defect exists. Measurement data of the test piece shows an average density can reach 3.286 g/cm³.

Then particle size-influencing values of examples 2 and 3 are shown in Table 6. In Table 6, L represents a difference percentage between the test piece and a standard product at a long side, W represents a difference percentage between the test piece and the standard product at a wide side, $t_m$ represents a difference percentage between the test piece and the standard product at a center thickness, and $t_1$ and $t_2$ represent difference percentages between the test piece and the standard product at thicknesses of both ends of a long side respectively.

TABLE 6

| Groups | Particle size distribution μm | L | W | $t_m$ | $t_1$ | $t_2$ | Weight g | Density g/cm³ |
|---|---|---|---|---|---|---|---|---|
| | | | | % | | | | |
| A | 75~125 | N/D | N/D | N/D | N/D | N/D | N/D | 2.325 |
| B | 44~75 | 0.09 | 0.62 | 1.68 | N/D | N/D | 3.023 | 3.012 |
| C | Less than 44 | N/D | N/D | N/D | N/D | N/D | N/D | N/D |
| D | 88~105 | −0.24 | 11.66 | 22.86 | N/D | N/D | 1.540 | 2.491 |
| E | 75~88 | −0.01 | 0.44 | 2.18 | −1.46 | −1.68 | 1.713 | 2.990 |
| F | 63~75 | 0.02 | 0.46 | 0.64 | 1.68 | −0.86 | 1.925 | 3.286 |

As can be seen from the results in Table 6, when the particle size interval of the composite material spans 100 μm of a thickness of a powder-spreading layer, the powder interacts with the formed layer during powder spreading, an object deforms by dragging; when the particle size interval is less than 44 μm, dense stacking of fine powder causes that a mechanism cannot spread powder smoothly; and the powder in a particle size interval of 63-75 μm obtains a yield of more than 20 wt % and the highest forming density in a particle size-influencing experiment. Further, SEM results show that when the powder with a smaller particle size is used, the powder is more densely stacked in the test piece, and the amount of warp deformation of the test piece is also reduced, indicating that the powder is densely stacked and a heat transfer is uniform.

Example 4

In the above examples, the highest laser power ratio 3 capable of being set by a machine is mainly used and a corresponding energy density is 0.049 J/mm². In the present example, the laser power ratios 1 and 2 are taken, the corresponding energy densities are 0.0137 J/mm² and 0.0281 J/mm² respectively. An impact of the energy density on formability is tested in comparison with group F in the example 3.

A particle size distribution and printing operation parameters of the particle material for three-dimensional printing used in each group are shown in Table 7 below (a preheating temperature of a powder supply tank is fixed at 90° C.). The printed test piece is a long test piece having a length (L), a width (W) and a thickness (t) of 15 mm, 10 mm and 4 mm respectively, a size, a weight and a density of the green body are recorded, and thicknesses $t_1$ and $t_2$ at both ends of a long side are used to indicate a degree of warp deformation of the test piece.

TABLE 7

| Groups | Particle size of particle material for three-dimensional printing (μm) | Preheating temperature of printing tank (° C.) | Energy density (J/mm²) | Thickness of spreading layer (μm) |
|---|---|---|---|---|
| F | 63~75 | 120 | 0.049 | 100 |
| G | 63~75 | 110 | 0.0137 | 100 |
| H | 63~75 | 130 | 0.0281 | 100 |

1. Group G

Changing the laser energy density has less direct effect on a powder laying process, such that no significant abnormality occurs. Under the energy density of 0.0137 J/mm², the test piece is layered and soft, and is easy to separate when touched, indicating that the laser energy density is low and an action depth is not enough to ensure that an upper layer and a lower layer are smoothly connected. Two more intact test pieces are used for measurement. A thickness is reduced by about 12.5% on average, length and width are slightly smaller, and an average density is only 2.975 g/cm³ due to a poor interlayer bonding degree difference and partial breakage.

2. Group H

Figure 4:
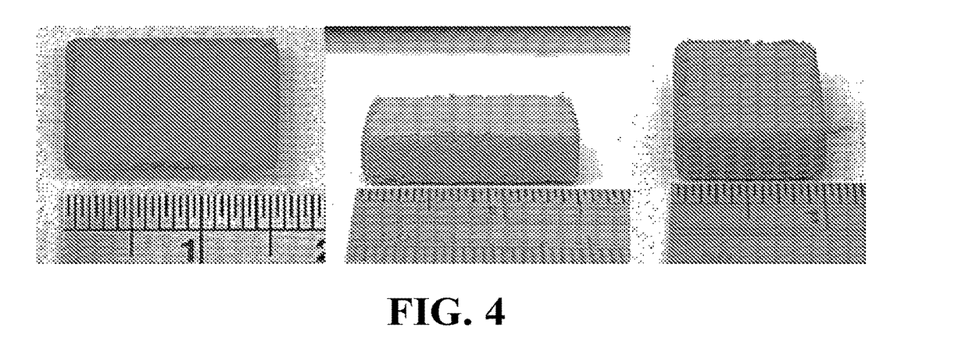
FIG. 4 shows a green body of group H in example 4.

The powder spreading under the energy density of 0.0281 J/mm² is not abnormal. The appearance of the test piece was free from any significant defects except for a portion of the burrs (shown in FIG. 4). A measured average density of 3.292 g/cm³ is slightly higher than that in group F, but an average size of the test piece is smaller and the size at edges reduces to about 4% (Table 4.17).

Then laser energy density-influencing values of groups F, G, and H are arranged in Table 8. In Table 8, L represents a difference percentage between the test piece and a standard product at a long side, W represents a difference percentage between the test piece and the standard product at a wide side, $t_m$ represents a difference percentage between the test piece and the standard product at a center thickness, and $t_1$ and $t_2$ represent difference percentages between the test piece and the standard product at thicknesses of both ends of a long side respectively.

TABLE 8

| Groups | Laser energy density J/mm² | L | W | $t_m$ % | $t_1$ | $t_2$ | Weight g | Density g/cm³ |
|---|---|---|---|---|---|---|---|---|
| G | 0.0137 | -0.80 | -1.45 | -12.88 | -11.25 | -12.5 | 1.499 | 2.975 |
| H | 0.0281 | -0.70 | -0.51 | -2.46 | -4.54 | -4.18 | 1.856 | 3.292 |
| F | 63~75 | 0.02 | 0.46 | 0.64 | -1.68 | -0.86 | 1.925 | 3.286 |

From the results of Table 8, it can be seen that when the laser energy density is 0.013 J/mm², the test piece is layered; when the laser energy density is 0.0287 J/mm², a size of the test piece is smaller than that of 0.049 J/mm², but the density of the green body is close, indicating that a bonding between object layers and the size are greatly affected when the energy density was insufficient.

Example 5

In this example, an effect of a powder-spreading layer thickness on printing is tested. Since it is expected to control an accumulation layer manufacturing accuracy within 100 μm per layer, a layer thickness lower limit of 75 μm capable of being set by a machine is used for printing. In comparison with group F, an effect of a smaller powder-spreading layer thickness is analyzed.

A particle size distribution and printing operation parameters of the particle material for three-dimensional printing used are shown in Table 9 below (a preheating temperature of a powder supply tank is fixed at 90° C.). The printed test piece is a long test piece having a length (L), a width (W) and a thickness (t) of 15 mm, 10 mm and 4 mm respectively, a size, a weight and a density of the green body are recorded, and thicknesses $t_1$ and $t_2$ at both ends of a long side are used to indicate a degree of warp deformation of the test piece.

TABLE 9

| Groups | Particle size of particle material for three-dimensional printing (μm) | Preheating temperature of printing tank (° C.) | Energy density (J/mm²) | Thickness of spreading layer (μm) |
|---|---|---|---|---|
| F | 63~75 | 120 | 0.049 | 100 |
| I | 63~75 | 120 | 0.049 | 75 |

Figure 5:
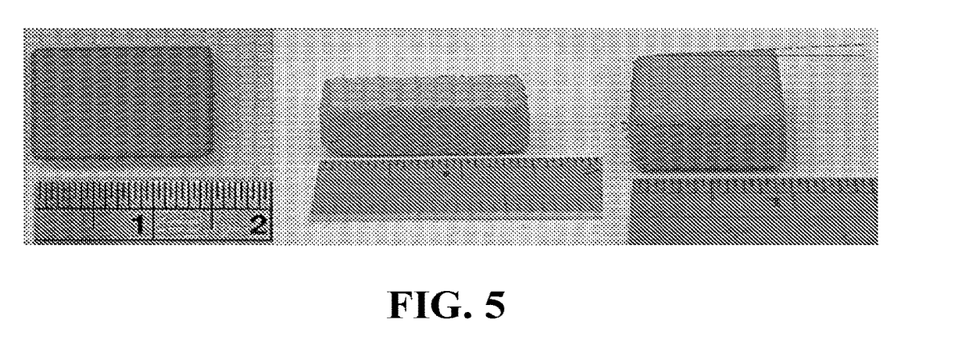
FIG. 5 shows a green body of group I in example 5.

The test piece with a thickness of 4 mm is actually cut into 3.975 mm at a layer thickness of 75 μm. No significant defects are observed in a powder spreading in group I and the test piece is observed to be inclined in an appearance, indicating that the test piece is slightly distorted by dragging during the powder spreading process (shown in FIG. 5). An average printing density in measured data can reach 3.385 g/cm³, which is higher than the density of 3.286 g/cm³ in group F.

In addition, spreading layer thickness-influencing values of groups I and F are arranged in Table 10. In Table 10, L represents a difference percentage between the test piece and a standard product at a long side, W represents a difference percentage between the test piece and the standard product at a wide side, $t_m$ represents a difference percentage between the test piece and the standard product at a center thickness, and $t_1$ and $t_2$ represent difference percentages between the test piece and the standard product at thicknesses of both ends of a long side respectively.

TABLE 10

| Groups | Thickness of spreading layer μm | L | W | $t_m$ % | $t_1$ | $t_2$ | Weight g | Density g/cm³ |
|---|---|---|---|---|---|---|---|---|
| I | 75 | -0.59 | -0.39 | 0.41 | -1.42 | -1.10 | 1.934 | 3.385 |
| F | 100 | 0.02 | 0.46 | 0.64 | -1.68 | -0.86 | 1.925 | 3.286 |

From the results in Table 10, it can be seen that the test piece of group I has reduced dimensions in length and width, the powder is more densely stacked due to a low powder-spreading layer thickness, but the length and width are reduced due to slight deformation since an upper limit of the powder is close to the layer thickness.

Example 6

In the particle size-influencing analysis of the above examples 2 and 3, the highest molding density is obtained by preheating at 120° C. in group F, but the powder spreading is not flat, such that in this example, the powder at a slightly lower temperature is tested at 110° C. In addition, two parameters of 130° C. and 140° C. are set between and after a first melting curve of a DSC curve for an experiment. The experiment is performed with a powder in a particle size interval of 63-75 μm, an energy density of 0.049 J/mm², and a spreading layer thickness of 100 μm. Specific operating parameters are shown in Table 11 (a preheating temperature of a powder supply tank is fixed at 90° C.).

TABLE 11

| Groups | Particle size of particle material for three-dimensional printing (μm) | Preheating temperature of printing tank (° C.) | Energy density (J/mm²) | Thickness of spreading layer (μm) |
|---|---|---|---|---|
| F | 63~75 | 120 | 0.049 | 100 |
| J | 63~75 | 110 | 0.049 | 100 |
| K | 63~75 | 130 | 0.049 | 100 |
| L | 63~75 | 140 | 0.049 | 100 |

Then printing results of each group are explained.
1. Group J

Figure 6:
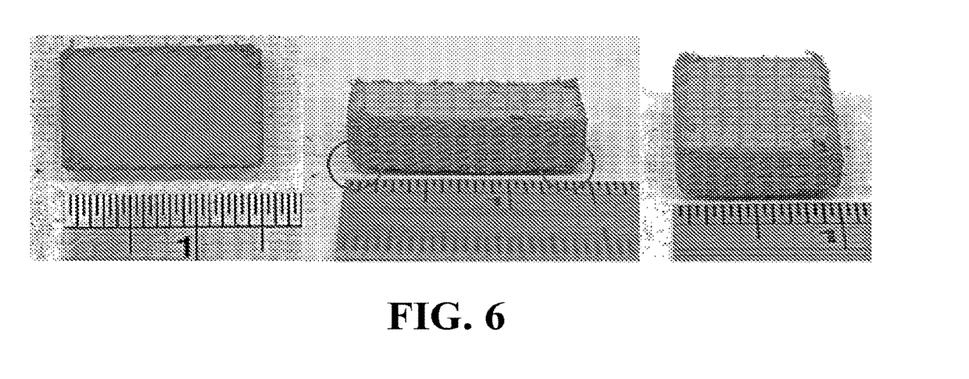
FIG. 6 shows a green body of group J in example 6.

The powder spreading of group J is smoother on a surface of the powder in a printing area compared to that of group F. An appearance of the test piece shows obvious burrs and a larger warping radian at a bottom part of the test piece (shown in FIG. 6). Although a measured average density of 3.284 g/cm³ is almost the same as that of group F, thickness deformation at an edge is reduced and an average weight is lower.

2. Group K

Figure 7:
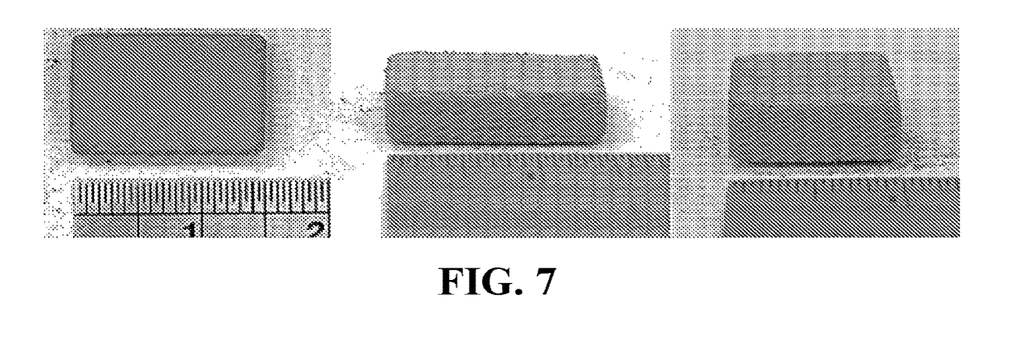
FIG. 7 shows a green body of group K in example 6.

In group K, the surface of the printing area is coarse and a powder-spreading layer is gradually decreased upward. In addition, no obvious burr is produced in an appearance of the test piece of group K, indicating that the test piece has a relatively high binding (shown in FIG. 7). A measured result shows an average density is raised to 3.498 g/cm³ and a size is slightly enlarged. Thus it can be known that as a preheating temperature rises to a first melting peak value greater than 128.43° C., powder packing is denser and the surrounding powder has begun to be affected by heating and sintering diffuses outward.

3. Group L

Figure 8:
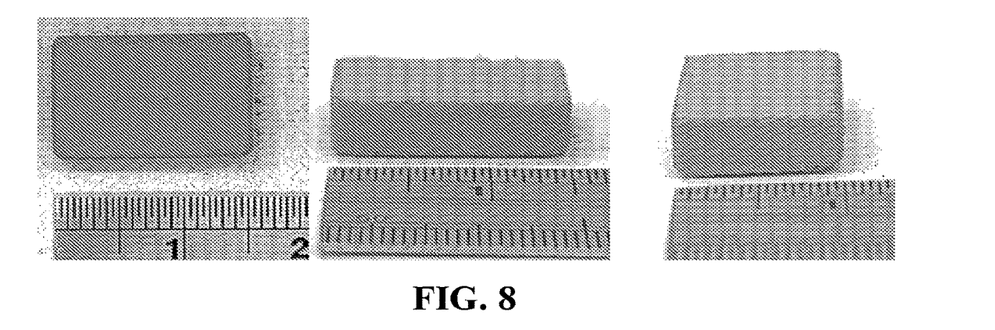
FIG. 8 shows a green body of group L in example 6.

In group L, a little powder rises at a powder supply tank. Besides, when the test piece is taken out, the powder around the test piece is found to be bonded into a solider block in comparison with group K. The appearance of the test piece is similar to that in group K group without obvious defects (shown in FIG. 8). Measurement data shows an average density of a green body does not grow upwards anymore and the whole test piece size does not expand further. Since the surrounding powder is agglomerated, the residual powder is removed and the powder is recovered when printing is performed at the same temperature.

Then preheating temperature-influencing values of groups F, J, K, and L are arranged in Table 12. In Table 12, L represents a difference percentage between the test piece and a standard product at a long side, W represents a difference percentage between the test piece and the standard product at a wide side, $t_m$ represents a difference percentage between the test piece and the standard product at a center thickness, and $t_1$ and $t_2$ represent difference percentages between the test piece and the standard product at thicknesses of both ends of a long side respectively.

TABLE 12

| Groups | Temperature ° C. | L | W | $t_m$ % | $t_1$ | $t_2$ | Weight g | Density g/cm³ |
|---|---|---|---|---|---|---|---|---|
| J | 110 | 0.06 | 0.21 | 0.46 | −3.93 | −3.89 | 1.860 | 3.284 |
| F | 120 | 0.02 | 0.46 | 0.64 | −1.68 | −0.86 | 1.925 | 3.286 |
| K | 130 | 0.47 | 1.59 | 2.07 | 0.71 | 0.64 | 2.140 | 3.498 |
| L | 140 | 0.84 | 1.73 | 2.96 | 2.25 | 2.25 | 2.169 | 3.490 |

From the results in Table 12, it can be seen that the densities of the green bodies at the preheating temperatures of 110° C. and 120° C. are 3.284 g/cm³ and 3.286 g/cm³ respectively; the densities of the green body test pieces at the preheating temperatures of 130° C. and 140° C. are 3.498 g/cm³ and 3.490 g/cm³ respectively, indicating that the density of the green body test piece is remarkably improved by nearly 0.21 g/cm³ after spanning the first melting peak value of 128.43° C., an edge error grows from a negative value to a positive value, and an integral size is increased along with the temperature. SEM is used to observe that the warpage of a bottom part of the test piece decreases with an increase of the temperature.

Example 7

Figure 9:
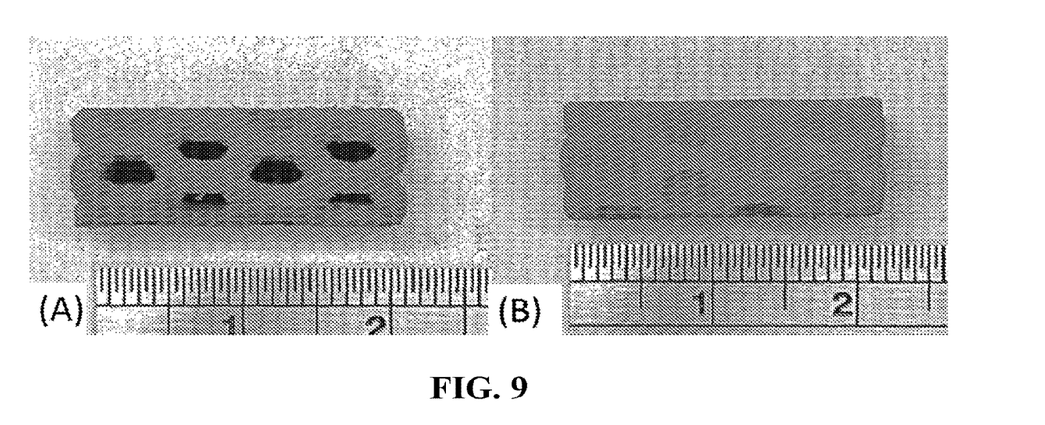
FIG. 9 shows a green body obtained when a preheating temperature of a printing tank is 120° C. and 130° C. in example 7.

In this example, a hexagonal-grid cylinder having a wall thickness and a hexagonal-grid side length of 2 mm is printed using the particle material for three-dimensional printing obtained in example 1, and the removability of the powder is tested. Operating parameters are as follows:
Particle size distribution: 63-75 μm
Preheating temperature of powder supply tank: 90° C.
Preheating temperature of printing tank: 120° C. and 130° C.
Laser energy density: 0.0281 J/mm²
Thickness of spreading layer: 100 μm Referring to FIG. 9, (A) and (B) in FIG. 9 respectively show green bodies obtained when the preheating temperatures of the printing tank are 120° C. and 130° C. When the preheating temperature of the printing tank is 120° C., a hollow part of the green body object can be smoothly removed by using a dust blowing ball; and when the preheating temperature of the printing tank is 130° C., a strength of the residual powder in the hollow part of the green body object is improved, and the powder cannot be removed smoothly by the dust blowing ball.

As can be seen from the above examples, when the powder particle size interval (75-125 μm and 88-105 μm) spans 100 μm of a spreading layer thickness, the powder interacts with the formed layer, such that an object deforms by dragging; when the particle size interval is less than 44 μm, fine powder is agglomerated, such that a mechanism cannot spread powder smoothly; and the powder in a particle size interval of 63-75 μm obtains the highest forming density. It is shown that when the powder is in a particle size interval of 63-75 μm, the powder can be spread smoothly and heat can be transferred uniformly, so as to increase forming density and reduce warping.

In addition, results of an energy density experiment show that the test piece at 0.0137 J/mm² is layered, the green body at 0.0281 J/mm² has a size less than that of 0.049 J/mm², but the green bodies have similar densities, indicating that a bonding between powder layers and the size of an object are greatly affected when the energy density was insufficient. Results of a layer thickness experiment show that when a powder-spreading layer is 75 μm, an obtained average density of the green body is 3.385 g/cm³, but a length and a width are reduced, indicating that the powder-spreading layer thickness is thinner, the powder can be arranged and stacked more tightly, an upper limit of the powder particle size is close to the layer thickness, such that the object is easy to deform. The composite material can obviously improve the density of the green body from 3.286 g/cm³ to 3.498 g/cm³ by about 6.5% at the preheating temperature between 120° C. and 130° C., and the edge error grows from a negative value to a positive value. The overall size increases with an increasing temperature, indicating that after the preheating temperature crosses a first peak value of 128.43° C. (DSC), a spilled heat energy is sufficient to sinter the powder outside the contour of the object. The green body obtained under the particle size interval of 63-75 μm, the energy density of 0.049 J/mm², the layer thickness of 100 μm, and the preheating temperature of the printing tank of 130° C. has the highest forming density of 3.498 g/cm³.

As described above, the content of the invention has been specifically exemplified in the above-exemplified examples, but the invention is not limited to the embodiments. Those having ordinary skills in the art to which the invention pertains should understand that various changes and modifications can be made without departing from the spirit and scope of the invention. For example, the technical contents exemplified in the foregoing examples are combined or changed to become a new embodiment, and these embodiments are of course considered as belonging to the invention. Therefore, the scope of protection to be covered in this case also includes the scope of the claims described below and the scope defined by them.

The invention claimed is:

1. A preparation method of a composite particle material for selective laser sintering, comprising the following steps:
   (a) mixing an inorganic powder with a binder under a specific condition to form a dough-like object; and
   (b) grinding the dough-like object after the dough-like object is cooled, so as to obtain a particle material for three-dimensional printing, wherein
   a volume ratio of the inorganic powder to the binder is (43:57) to (72:28);
   the binder contains 70-90 vt % of a filler, 5-25 vt % of a backbone proppant, and 1-10 vt % of a surfactant;
   the filler is polyoxymethylene;
   the backbone proppant is at least one selected from high-density polyethylene (HDPE), polypropylene (PP), polyamide (PA), polycarbonate (PC), polymethyl methacrylate (PMMA) and ABS resin;
   the surfactant is at least one selected from stearic acid (SA), carnauba wax, ethylene bis stearamide (EBS), paraffin, PE wax, antioxidant 1010, and microcrystalline wax; and
   a specific condition is a temperature of 25-410° C. and a rotation speed of 2-50 rpm.

2. The preparation method of a composite particle material for selective laser sintering according to claim 1, wherein the inorganic powder has a D10 of 1-10 μm, a D50 of 3-25 μm, and a D90 of 20-100 μm.

3. The preparation method of a composite particle material for selective laser sintering according to claim 1, wherein the inorganic powder is selected from any one of a metal, a ceramic, and a glass.

4. A composite particle material for selective laser sintering, comprising an inorganic powder and a binder coated on an outer surface of the inorganic powder, wherein
   a volume ratio of the inorganic powder to the binder is (43:57) to (72:28);
   the inorganic powder is selected from any one of a metal, a ceramic, and a glass;
   the binder contains 70-90 vt % of a filler, 5-25 vt % of a backbone proppant, and 1-10 vt % of a surfactant;
   the filler is polyoxymethylene;
   the backbone proppant is at least one selected from high-density polyethylene (HDPE), polypropylene (PP), polyamide (PA), polycarbonate (PC), polymethyl methacrylate (PMMA) and ABS resin; and
   the surfactant is at least one selected from stearic acid (SA), carnauba wax, ethylene bis stearamide (EBS), paraffin, PE wax, antioxidant 1010, and microcrystalline wax.

5. The composite particle material for selective laser sintering according to claim 4, wherein the inorganic powder has a D10 of 1-10 μm, a D50 of 3-25 μm, and a D90 of 20-100 μm.

6. A three-dimensional printing method for a high-density green body, comprising the following steps:
   (a) obtaining a composite particle material for selective laser sintering by using the preparation method according to claim 1;
   (b) laying the composite particle material for selective laser sintering into a powder layer, preheating the powder layer, and selectively irradiating the powder layer by laser beam scanning to melt and coalesce the irradiated region;
   (c) cooling and solidifying the region to form a thin layer which is a part of the high-density green body; and
   (d) repeating step b and step c to stack layer by layer until the high-density green body is obtained, wherein
   a particle size of the composite particle material for selective laser sintering is smaller than a thickness of the powder layer; and
   the high-density green body has a density equal to or greater than 2.325 g/cm³.

7. The three-dimensional printing method for a high-density green body according to claim 6, wherein in step (b), when the thickness of the powder layer is 100 μm, the particle size of the composite particle material for selective laser sintering is 44-75 μm.

8. The three-dimensional printing method for a high-density green body according to claim 7, wherein in step (b), a laser beam has an energy density of 0.0281-0.049 J/mm², a preheating temperature is 120-140° C. and laser power is 1 W~10 W.

9. The three-dimensional printing method for a high-density green body according to claim 6, wherein after step d, the high-density green body is processed by a degreasing process and a sintering process in sequence to obtain a final product composed of the inorganic powder.

10. The three-dimensional printing method for a high-density green body according to claim 9, wherein the degreasing process is any one of catalytic degreasing, solvent degreasing, and thermal degreasing, and the sintering process is performed at a temperature of 1,200-1,450° C. for a total time of 11-40 hours.

* * * * *